(12) United States Patent
Takano et al.

(10) Patent No.: US 11,325,325 B2
(45) Date of Patent: May 10, 2022

(54) METHOD FOR MANUFACTURING FIBER REINFORCED PLASTIC MOLDED BODY

(71) Applicant: Mitsubishi Chemical Corporation, Chiyoda-ku (JP)

(72) Inventors: Tsuneo Takano, Tokyo (JP); Takashi Honma, Tokyo (JP); Satoshi Kaji, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 318 days.

(21) Appl. No.: 16/392,122

(22) Filed: Apr. 23, 2019

(65) Prior Publication Data

US 2019/0270225 A1 Sep. 5, 2019

Related U.S. Application Data

(63) Continuation of application No. PCT/JP2017/039303, filed on Oct. 31, 2017.

(30) Foreign Application Priority Data

Oct. 31, 2016 (JP) ............................. JP2016-213228

(51) Int. Cl.
*B29C 70/46* (2006.01)
*B29C 43/32* (2006.01)
(Continued)

(52) U.S. Cl.
CPC ............. *B29C 70/46* (2013.01); *B29C 33/52* (2013.01); *B29C 43/003* (2013.01); *B29C 43/04* (2013.01);
(Continued)

(58) Field of Classification Search
CPC ..... B29C 70/342; B29C 70/345; B29C 70/44; B29C 33/52; B29C 43/10;
(Continued)

(56) References Cited

U.S. PATENT DOCUMENTS 3,717,485 A * 2/1973 Larson .................... C08L 91/06
106/38.8
3,754,943 A * 8/1973 Solomon .............. C08K 5/3477
106/38.8
(Continued)

FOREIGN PATENT DOCUMENTS

CN 1492801 A 4/2004
CN 101484291 A 7/2009
(Continued)

OTHER PUBLICATIONS

Machine translation of JP 2012-187730 A, Apr. 29, 2021 (Year: 2021).*
(Continued)

*Primary Examiner* — Benjamin A Schiffman
(74) *Attorney, Agent, or Firm* — Oblon, McClelland, Maier & Neustadt, L.L.P.

(57) ABSTRACT

Provided is a method for manufacturing a fiber reinforced plastic molded body, the method including: performing thermocompression molding, by using a molding die, on a molding precursor which is obtained by arranging a prepreg including a thermosetting resin and a fiber around a thermoplastic solid body.

20 Claims, 3 Drawing Sheets

(51) Int. Cl.
*B29C 33/52* (2006.01)
*B29C 43/00* (2006.01)
*B29C 43/04* (2006.01)
*B29C 43/18* (2006.01)
*B29C 43/36* (2006.01)
*B29C 43/10* (2006.01)
B29C 43/58 (2006.01)
B29K 105/08 (2006.01)
B29K 691/00 (2006.01)
B29K 105/06 (2006.01)

(52) U.S. Cl.
CPC .............. *B29C 43/10* (2013.01); *B29C 43/18* (2013.01); *B29C 43/32* (2013.01); *B29C 43/361* (2013.01); *B29C 2043/108* (2013.01); *B29C 2043/181* (2013.01); *B29C 2043/3261* (2013.01); *B29C 2043/3613* (2013.01); *B29C 2043/3668* (2013.01); *B29C 2043/5816* (2013.01); *B29K 2105/06* (2013.01); *B29K 2105/0872* (2013.01); *B29K 2691/00* (2013.01); *B29K 2891/00* (2013.01); *B29K 2901/12* (2013.01); *B29K 2995/0063* (2013.01)

(58) Field of Classification Search
CPC ...... B29C 2043/108; B29C 2043/3205; B29C 2043/5023; B29C 2043/3261
See application file for complete search history.

(56) References Cited

U.S. PATENT DOCUMENTS

| | | | | |
|---|---|---|---|---|
| 4,271,116 A * | 6/1981 | Jones | ...................... | B29C 33/52 264/221 |
| 4,581,190 A * | 4/1986 | Nagamoto | ............. | B29C 70/345 264/136 |
| 5,665,301 A * | 9/1997 | Alanko | ................. | B29C 70/548 264/571 |
| 6,484,514 B1 | 11/2002 | Joseph et al. | | |
| 8,734,925 B2 * | 5/2014 | Kweder | ............. | B29D 99/0028 428/35.7 |
| 10,022,898 B2 * | 7/2018 | Takano | .................... | B29C 43/10 |
| 10,532,498 B2 * | 1/2020 | Takano | ..................... | B60B 5/02 |
| 2002/0038923 A1 * | 4/2002 | Lenherr | .................. | B29C 33/52 264/221 |
| 2005/0116136 A1 | 6/2005 | Artz et al. | | |
| 2005/0258575 A1 | 11/2005 | Kruse et al. | | |
| 2010/0092708 A1 * | 4/2010 | Jacob | ..................... | B29C 70/44 428/36.4 |
| 2013/0101406 A1 | 4/2013 | Kweder et al. | | |
| 2015/0183139 A1 | 7/2015 | Takano et al. | | |
| 2019/0270225 A1 * | 9/2019 | Takano | ................... | B29C 43/32 |
| 2021/0394462 A1 * | 12/2021 | Kaji | ........................ | B29C 70/48 |

FOREIGN PATENT DOCUMENTS

| | | | | |
|---|---|---|---|---|
| CN | 103974819 A | | 8/2014 | |
| CN | 104349879 A | | 2/2015 | |
| DE | 102013106876 A1 * | | 1/2015 | ............. B32B 3/04 |
| DE | 102014207949 A1 * | | 10/2015 | ............. B29C 33/76 |
| EP | 0862978 A1 * | | 9/1998 | ............. B29C 33/52 |
| EP | 1 695 805 A1 | | 8/2006 | |
| EP | 2 860 006 A1 | | 4/2015 | |
| JP | 51-25072 B | | 7/1976 | |
| JP | 61-63413 A | | 4/1986 | |
| JP | 61 -242814 | | 10/1986 | |
| JP | 62-5842 | | 1/1987 | |
| JP | 3-262611 A | | 11/1991 | |
| JP | 4-7127 | | 1/1992 | |
| JP | 4-332612 | | 11/1992 | |
| JP | 2006327103 A * | | 12/2006 | ............. B29C 33/52 |
| JP | 2007-307853 | | 11/2007 | |
| JP | 2012-187730 | | 10/2012 | |
| JP | 2012187730 A * | | 10/2012 | ............... B32B 3/04 |
| JP | 2014-208420 | | 11/2014 | |
| JP | 2014-534914 | | 12/2014 | |
| JP | 2019188707 A * | | 10/2019 | |
| JP | 2020032535 A * | | 3/2020 | |
| WO | WO 2013/059062 A2 | | 4/2013 | |
| WO | WO 2013/187399 A1 | | 12/2013 | |
| WO | WO-2020184163 A1 * | | 9/2020 | ............. B29C 33/38 |
| WO | WO-2021193524 A1 * | | 9/2021 | ............. B29C 33/76 |

OTHER PUBLICATIONS

Extended European Search Report dated Sep. 23, 2019 in European Patent Application No. 17865293.9, citing documents AA-AC and AO therein, 6 pages.
International Search Report dated Dec. 12, 2017 in PCT/JP2017/039303 filed Oct. 31, 2017 (with English Translation).
Office Action dated Aug. 27, 2018 in Japanese Patent Application No. 2017-562082 (with English translation).
Combined Chinese Office Action and Search Report dated Sep. 29, 2020 in corresponding Chinese Patent Application No. 201780065890.6 (with English Translation) citing documents AO-AU therein, 23 pages.
European Office Action dated Sep. 16, 2020 in Patent Application No. 17 865 293.9, citing documents AA, AB and AO therein, 4 pages.

* cited by examiner

METHOD FOR MANUFACTURING FIBER REINFORCED PLASTIC MOLDED BODY

This application is a continuation application of International Application No. PCT/JP2017/039303, filed on Oct. 31, 2017, which claims the benefit of priority of the prior Japanese Patent Application No. 2016-213228 filed on Oct. 31, 2016, the entire contents of which are incorporated herein by reference.

TECHNICAL FIELD

The present invention relates to a method for manufacturing a fiber reinforced plastic molded body.

BACKGROUND ART

Fiber reinforced plastic (FRP) molded bodies having a hollow shape, a U shape, and the like have been widely used in large molded bodies such as bodies and wings of aircrafts to small molded bodies such as bicycle frames, tennis rackets, fishing rods, and golf shafts.

As a method for manufacturing fiber reinforced plastic molded bodies having a hollow shape, a U shape, and the like, a method has been known in which a prepreg obtained by immersing a resin in a fiber (filament) is arranged around a core, molding is performed, and then the core is removed.

For example, a method has been proposed in which FRP materials are staked on a molding die made of a wax, and the molding die made of a wax is melted and removed after molding and curing (Patent Document 1).

Further, a method has been proposed which includes a step of preparing a core using a synthetic wax, a step of pasting a prepreg to the entire outer surface of the core and forming a wax discharge hole in the pasted prepreg, and a step of discharging the melted synthetic wax from the wax discharge hole while the core and the prepreg are heated to thermally cure the prepreg to thereby obtain a fiber reinforced plastic molded body (Patent Document 2).

Further, a method has been proposed which includes a step of arranging a prepreg including a fiber reinforcement material and a thermosetting resin around a solid mandrel material, a step of curing the prepreg to form a fiber reinforced plastic molded body, a step of melting the mandrel material at a temperature lower than a glass transition temperature of the fiber reinforced plastic molded body to obtain a liquid material, a step of discharging the liquid material, and a step of cooling the fiber reinforced plastic molded body (Patent Document 3).

Further, a method has been proposed in which a liquid is sealed in a mandrel formed by a deformable hollow body, a continuous resin-impregnated fiber bundle is wound around the mandrel in a netlike manner, and then the resin is cured by increasing the internal pressure of the mandrel while being restricted by a heated molding die (Patent Document 4).

CITATION LIST

Patent Document

Patent Document 1: JP 4-7127 A
Patent Document 2: JP 2007-307853 A
Patent Document 3: JP 2014-534914 W
Patent Document 4: JP 62-5842 A

SUMMARY OF THE INVENTION

Problem to be Solved by the Invention

In the method of Patent Document 1, since molding is performed by curing at normal temperature, the curing temperature becomes long, which results in a decrease in production efficiency. Further, since hand lay-up is performed directly to a wax surface layer, after the wax is melted and removed, there is a possibility that the wax remains between filaments.

In the method of Patent Document 2, since the core is melted and removed while the prepreg is cured, the number of processes is small. However, a part of the core is easily removed before the curing of the prepreg sufficiently proceeds, and particularly in the case of a large-sized fiber reinforced plastic molded body, the shape of the molded body is not stable and an air gap such as a void may occur in the molded body. Therefore, it is difficult to efficiently obtain a high-quality fiber reinforced plastic molded body, which is disadvantageous in terms of economical aspect.

Further, in the method of Patent Document 3, particularly in a case where a pressure is likely to be applied in one direction at the time of closing a mold such as a molding die provided with an upper mold and a lower mold, a pressure is hardly applied uniformly to the mandrel material and a molding failure such as a void of a rising surface (surface extending in an upper direction from a bottom portion of a mold cavity) or chipping of the corner portion easily occurs.

Further, in the method of Patent Document 4, since gas such as air is sealed in the mandrel, the molding pressure is easily decreased, and a molding failure easily occurs at the rising surface or the corner portion.

An object of the invention is to provide a method for manufacturing a fiber reinforced plastic molded body by which it is possible to efficiently and economically manufacture a fiber reinforced plastic molded body with excellent appearance which has a high degree of freedom for the shape of molding and in which occurrence of a molding failure can be suppressed even in the case of a large-sized fiber reinforced plastic molded body.

Means for Solving Problem

The invention has the following configurations.

[1] A method for manufacturing a fiber reinforced plastic molded body, the method including performing thermocompression molding, by using a molding die, on a molding precursor which is obtained by arranging a prepreg including a thermosetting resin and a fiber around a thermoplastic solid body.

[2] The method for manufacturing a fiber reinforced plastic molded body described in [1], in which a density of the thermoplastic solid body is 8 g/cm$^3$ or less.

[3] The method for manufacturing a fiber reinforced plastic molded body described in [1] or [2], in which the thermoplastic solid body is a wax.

[4] The method for manufacturing a fiber reinforced plastic molded body described in any one of [1] to [3], in which a filler having a lower density than that of the thermoplastic solid body is further accommodated in the thermoplastic solid body.

[5] The method for manufacturing a fiber reinforced plastic molded body described in [4], in which a proportion of the filler with respect to 100% by volume of the total of the thermoplastic solid body and the filler is set to 5 to 70% by volume.

[6] The method for manufacturing a fiber reinforced plastic molded body described in any one of [1] to [5], in which the molding precursor includes a barrier layer formed between the thermoplastic and the prepreg.

[7] The method for manufacturing a fiber reinforced plastic molded body described in [6], in which the barrier layer is a flexible bag or a coating material.

[8] The method for manufacturing a fiber reinforced plastic molded body described in [6] or [7], in which the barrier layer includes a fiber reinforcing material.

[9] The method for manufacturing a fiber reinforced plastic molded body described in any one of [1] to [8], in which the thermocompression molding is performed under the condition that a relation between a melting point Tm (° C.) of the thermoplastic solid body and an average molding temperature Tf (° C.) satisfies Tf −60≤Tm≤Tf.

[10] The method for manufacturing a fiber reinforced plastic molded body described in any one of [6] to [9], in which the thermocompression molding is performed under the condition that a relation between a melting point Tm (° C.) of the thermoplastic solid body and an average molding temperature Tf (° C.) and a melting point Tb (° C.) of a material forming the barrier layer satisfies Tm≤Tf<Tb.

[11] The method for manufacturing a fiber reinforced plastic molded body described in any one of [1] to [10], in which the thermocompression molding is performed in a state in which at least a part of a surface layer portion of the thermoplastic solid body is melted.

[12] The method for manufacturing a fiber reinforced plastic molded body described in any one of [1] to [11], in which the thermoplastic solid body is pressed in the molding die at the time of the thermocompression molding.

[13] The method for manufacturing a fiber reinforced plastic molded body described in [12], in which the pressing of the thermoplastic solid body is performed by a rod provided in the molding die.

[14] The method for manufacturing a fiber reinforced plastic molded body described in any one of [1] to [13], in which the thermoplastic solid body is removed from the obtained fiber reinforced plastic molded body after the thermocompression molding.

[15] The method for manufacturing a fiber reinforced plastic molded body described in [14], in which the thermoplastic solid body is discharged outside the fiber reinforced plastic molded body at a temperature that is equal to or lower than a heat distortion temperature of the fiber reinforced plastic molded body and equal to or higher than the melting point Tm (° C.) of the thermoplastic solid body.

Effect of the Invention

According to the method for manufacturing a fiber reinforced plastic molded body of the invention, it is possible to efficiently and economically manufacture a fiber reinforced plastic molded body with excellent appearance which has a high degree of freedom for the shape of molding and in which occurrence of a molding failure can be suppressed even in the case of a large-sized fiber reinforced plastic molded body.

MODE(S) FOR CARRYING OUT THE INVENTION

Figure 1:
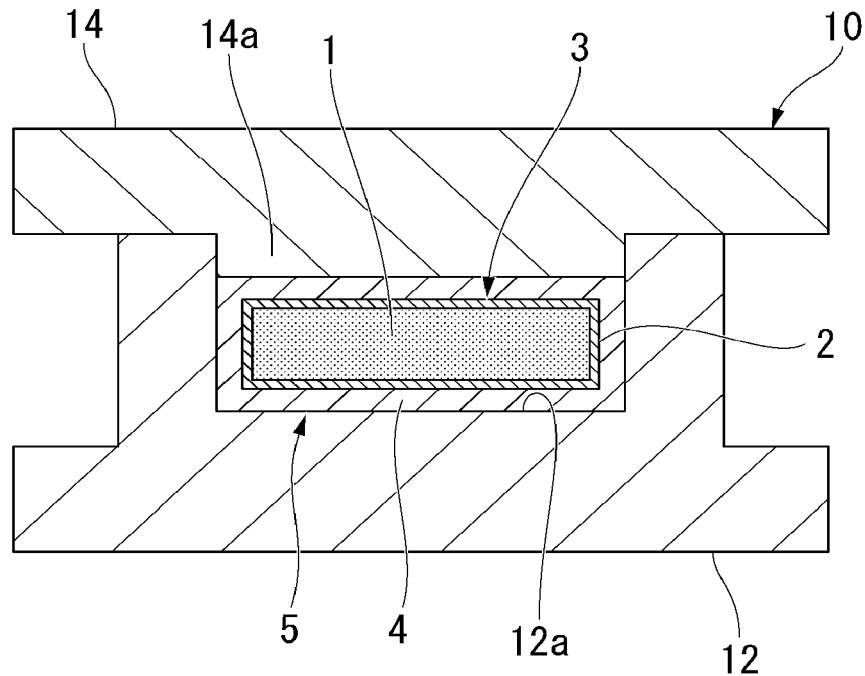
FIG. 1 is a schematic cross-sectional view illustrating an example of thermocompression molding in a method for manufacturing a fiber reinforced plastic molded body of the invention.

A method for manufacturing a fiber reinforced plastic molded body of the invention is a method for obtaining a fiber reinforced plastic molded body by performing thermocompression molding, by using a molding die, on a molding precursor which is obtained by arranging a prepreg including a thermosetting resin and a fiber around a thermoplastic solid body.

The thermoplastic solid body used in the invention has a function as a core used when a fiber reinforced plastic molded body having a hollow shape, a U shape, or the like is manufactured, and is configured by a material which does not show plasticity at an atmospheric temperature before hot-press molding typified by a normal temperature (20° C.) but has a property that the material is softened or melted at the time of thermocompression molding and is freely distorted.

This thermoplastic solid body can be easily removed from the obtained molded body by setting the temperature, for example, to a temperature that is equal to or lower than a heat distortion temperature of the molded body and equal to or higher than a melting point of the thermoplastic solid body after the thermocompression molding.

This thermoplastic solid body is not particularly limited as long as it is configured by the above-described material, but a material having a density of 8 g/cm$^3$ or less is preferable. The reason for this is that by setting the density of the thermoplastic solid body to 8 g/cm$^3$ or less, the molding precursor can be decreased in weight, and particularly at the time of manufacturing a large-sized fiber reinforced plastic molded body, there is a tendency that workability becomes favorable and the distortion of the molding precursor due to its own weight can be prevented. The density is more preferably 2 g/cm$^3$ or less and further preferably 1 g/cm$^3$ or less. The lower limit is not particularly limited, but from the viewpoint of ensuring the minimum strength and workability, the density is preferably 0.6 g/cm$^3$ or more.

Examples of the material constituting the thermoplastic solid body may include a thermoplastic resin such as polyolefin, polyvinyl chloride, polystyrene, polyvinyl acetate, polyurethane, or an acrylic resin; a low melting point metal such as tin or indium; a fusible alloy such as solder, Wood's alloy, Rose's alloy, Lipowitz' alloy, or Newton alloy; and low melting point glass, but from the viewpoints that a melting point equal to or lower than a molding temperature of the prepreg can be obtained, processing to have a desired shape is easy, the density is low, and the molding precursor can be decreased in weight, it is preferable to use a wax.

As the wax, a natural wax such as paraffin wax or a synthetic wax such as Fischer-Tropsch wax or polyethylene wax can be appropriately selected and used. These may be used alone or in combination of two or more kinds thereof, and when a wax for lost-wax casting is used, there is a tendency that the wax is easy to remove after the molding of the fiber reinforced plastic molded body of the invention, which is preferable.

Further, in the thermoplastic solid body used in the invention, it is preferable to further accommodate a filler having a lower density than that of the thermoplastic solid body.

For example, by the wax containing a filler having a lower density than that of the wax, the mass of the thermoplastic solid body can be further decreased, so that handleability in the case of manufacturing a large-sized fiber reinforced plastic molded body is further excellent.

As the filler, any filler can be appropriately selected and used as long as it has a lower density than that of the thermoplastic solid body, but particularly, from the viewpoints that a thermal conductivity is low and the molding cycle is improved by efficiently increasing the temperature of the prepreg since the thermal energy in molding is difficult to excessively consume by the thermoplastic solid body, hollow glass beads and hollow metal balls are preferable.

Regarding the filler, one kind thereof may be used alone or two or more kinds thereof may be used in combination.

In the case of using a filler in the thermoplastic solid body, a proportion of the filler with respect to 100% by volume of the total of the thermoplastic solid body and the filler is preferably 5 to 70% by volume, more preferably 10 to 60% by volume, and further preferably 20 to 50% by volume. By setting the proportion of the filler to preferably 5% by volume or more, more preferably 10% by volume or more, and further preferably 20% by volume or more, the handleability of the thermoplastic solid body is further excellent, a large-sized fiber reinforced plastic molded body is easily manufactured, and the molding cycle is improved. By setting the proportion of the filler to preferably 70% by volume or less, more preferably 60% by volume or less, and further preferably 50% by volume or less, flowability is maintained by the thermoplastic solid body being melted, the internal pressure of the molding precursor is increased, and a sufficient pressure is easy to uniformly apply to the entire prepreg, so that a molding failure is easy to suppress.

Further, in the invention, it is preferable to use a molding precursor in which a barrier layer is formed around the thermoplastic solid body and a prepreg including a thermosetting resin and a fiber is arranged around the barrier layer. According to this, a melted product of the thermoplastic solid body is prevented from leaking out from the surface of the molding precursor during the thermocompression molding and the appearance and the shape of a molded article can be maintained to be favorable.

Examples of the barrier layer include a flexible bag and a coating material, and the barrier layer can be formed on the surface of the prepreg and/or the surface of the thermoplastic solid body; however, the barrier layer is preferably formed on the surface of the thermoplastic solid body since there is a tendency that moldability to a complicate shape or the appearance of the molded article becomes favorable.

The thickness of the barrier layer may be appropriately set within a range that the barrier layer has flexibility and breakage affecting the molded body during the thermocompression molding does not occur, and the thickness thereof may be set, for example, to 1 mm or less. The lower limit of the thickness of the barrier layer is not particularly limited, but from the viewpoint of ensuring the minimum strength, the thickness thereof is preferably 0.01 mm or more.

As the flexible bag, any bag having flexibility may be used, and examples thereof include bags formed by a nylon film, a polypropylene film, a polyethylene film, a fluororesin film, silicon rubber, and the like.

Further, as the coating material, any material fixed around the thermoplastic solid body and having flexibility may be used, and examples thereof include liquid rubbers containing an acrylic component or silicone as a main component. Furthermore, those which are melted at the time of the thermocompression molding to form a film around the thermoplastic solid body may be used. For example, nylon paper is arranged around the thermoplastic solid body and is caused to be melted at the time of the thermocompression molding, so that the barrier layer can be formed. Moreover, a liquid rubber and this paper can also be used in combination.

Particularly, in the case of using a coating material as the barrier layer, seams of the barrier layer can be eliminated and the seams are not transferred to a molded article to be obtained in the thermocompression molding, so that the appearance of the molded article can be made further excellent.

In the invention, it is preferable that a mold releasing process such as application of a mold releasing agent to the outer surface of the barrier layer formed around the thermoplastic solid body is performed or the barrier layer is doubled. According to this, the barrier layer attached with the thermoplastic solid body can be easily removed from the fiber reinforced resin molded body after the thermocompression molding.

Further, the barrier layer may include a fiber reinforcing material. Particularly, in a case where the barrier layer is configured by a coating material, when one obtained by stacking a coating material layer and a fiber reinforcing material layer is used as the barrier layer, the strength of the barrier layer is improved so that the breakage of the barrier layer at the time of the thermocompression molding can be prevented. The coating material layer and the fiber reinforcing material layer may be stacked in many layers and the stacking order thereof can be appropriately selected.

Herein, examples of a fiber which can be used in the fiber reinforcing material include polyester fibers, polyolefin fibers, acrylic fibers, glass fibers, aramid fibers, and vinylon fibers. These can be appropriately selected, but from the viewpoint of lightweight and favorable handleability, aramid fibers are preferable.

The form of the fiber reinforcing material which can be used in the barrier layer is not particularly limited, but examples thereof may include woven fabrics such as a non-crimped fabric and a cord fabric; paper or non-woven fabrics, and random material sheets of discontinuous fibers.

Hereinafter, an example of the method for manufacturing a fiber reinforced plastic molded body of the invention will be described in detail with reference to the drawings. Incidentally, the dimension and the like in the respective drawings are merely examples, and the invention is not necessarily limited to examples illustrated in the respective drawings and can be modified as appropriate without departing from the gist of the invention.

The method for manufacturing a fiber reinforced plastic molded body of the present embodiment includes the following molding step, and can further include the following discharging step of a thermoplastic solid body typified by a wax or the like.

Molding step: As illustrated in FIG. 1, thermocompression molding is performed on a molding precursor 5 which is obtained by arranging a prepreg 4 around a core 3 accommodating a wax 1 in a barrier layer 2 while at least a part of the wax 1 is melted by a molding die 10.

Figure 3A:
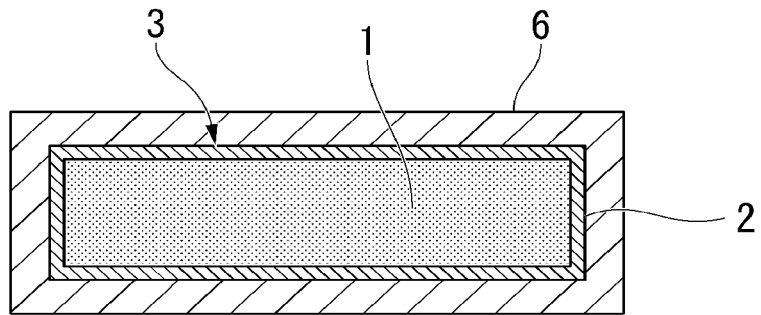
FIG. 3A is a schematic cross-sectional view illustrating a state in which a fiber reinforced plastic molded body embedding a wax as a thermoplastic solid body is obtained in the method for manufacturing a fiber reinforced plastic molded body of the invention.
Figure 3B:
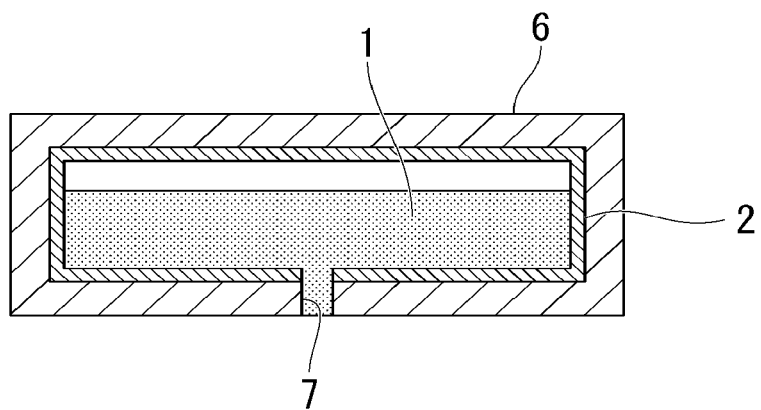
FIG. 3B is a schematic cross-sectional view illustrating a state in which a discharge port for discharging the wax is formed in the fiber reinforced plastic molded body obtained in FIG. 3A.
Figure 3C:
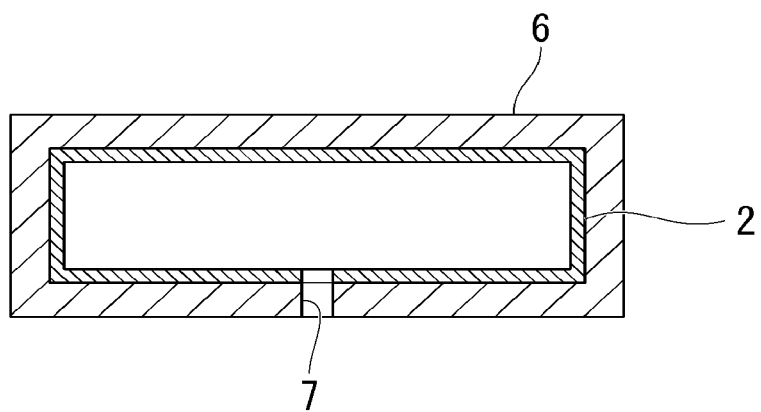
FIG. 3C is a schematic cross-sectional view illustrating a state after the wax is discharged through the discharge port formed in FIG. 3B.

Discharging step of thermoplastic solid body: As illustrated in FIGS. 3A to 3C, the wax 1 is discharged from a fiber reinforced plastic molded body 6 obtained after the molding step.

This example corresponds to a case where a square tubular fiber reinforced plastic molded body to be used in a pipe or the like is manufactured.

(Molding Step)

FIG. 1 is a cross-sectional view obtained by cutting the molding die 10 in a direction perpendicular to a length direction of the molding die.

In the molding step of the present embodiment, first, as illustrated in FIG. 1, thermocompression molding is performed, by the molding die 10, on the molding precursor 5 which is obtained by arranging the prepreg 4 around the core 3 accommodating the wax 1 in the barrier layer 2. According to this, as illustrated in FIG. 3A, the fiber reinforced plastic molded body 6 embedding the core 3 is obtainable.

A method for forming the core 3 is not particularly limited, and for example, a method is exemplified in which the wax 1, which has been molded by a mold in advance, is covered with a film forming a flexible bag 2, both ends of the film are attached or heat-sealed to each other to form the barrier layer 2, and the wax 1 is sealed, thereby obtaining the core 3. Further, a method may be employed in which the wax 1 is put in a shrink tube, both ends of the shrink tube are heat-sealed to each other to form the barrier layer 2, thereby obtaining the core 3. The method using a shrink tube is advantageous in that the barrier layer 2 easily follows the shape of the wax 1 and sealing is easily performed. In addition, the core 3 may be formed by melting and filling a wax in the barrier layer 2 obtained by blow molding and heat-sealing an opening of the barrier layer 2 to be sealed.

Alternatively, the core 3 may be formed by applying a liquid rubber serving as the barrier layer 2 to the entire surface around a thermoplastic solid body 1 and drying the liquid rubber. As further another method, the core 3 may be formed by applying a liquid rubber to the entire surface around the thermoplastic solid body 1, then pasting a non-woven fabric serving as a fiber reinforcing material, and further applying a liquid rubber thereto to form the barrier layer 2.

The prepreg 4 is a composite material for molding including a fiber and a thermosetting resin, and examples thereof include a uni-directional (UD) material in which fibers are arranged in one direction, a cloth material obtained by weaving fibers, and a sheet-shaped prepreg obtained by immersing an uncured thermosetting resin in a fiber reinforcement material such as a sheet molding compound (SMC) in which a non-woven fabric formed by fibers or fibers are chopped.

The fiber is not particularly limited, but examples thereof include carbon fibers, glass fibers, aramid fibers, silicon carbide fibers, and metallic fibers. Of these, from the viewpoint that a decrease in weight, an increase in strength, and an increase in elastic modulus of the molded body can be achieved, carbon fibers are preferable. Regarding the fiber, one kind may be used alone or two or more kinds thereof may be used in combination.

The thermosetting resin is not particularly limited, but examples thereof include an epoxy resin, a urea resin, a vinyl ester resin, an unsaturated polyester, polyurethane, and a phenolic resin. Regarding the thermosetting resin, one kind may be used alone or two or more kinds thereof may be used in combination.

Further, the content of the thermosetting resin (hereinafter, referred to as "resin content") with respect to the total mass of the prepreg 4 is preferably 15 to 50% by mass, more preferably 20 to 45% by mass, and further preferably 25 to 40% by mass. When the resin content is 15% by mass or more, adhesiveness between the fiber and the thermosetting resin can be sufficiently ensured, and when the resin content is 50% by mass or less, flame retardancy is further improved.

The prepreg 4 may include arbitrary components (additives) other than the fiber and the thermosetting resin if necessary. Examples of such arbitrary components include flame retardants (for example, a phosphorus-containing epoxy resin, red phosphorus, a phosphazene compound, a phosphoric acid salt, a phosphoric acid ester, and the like); mold releasing agents such as silicone oil, a wetting dispersant, an antifoaming agent, a defoaming agent, a natural wax, a synthetic wax, a metal salt of a linear fatty acid, an acid amide, an ester, and a paraffin; powders such as crystalline silica, molten silica, calcium silicate, alumina, calcium carbonate, talc, and barium sulfate; inorganic fillers such as glass fibers and carbon fibers; colorants such as carbon black and Bengala; and a silane coupling agent. Further, the content of the arbitrary component with respect to the total mass of the prepreg 4 is preferably 0 to 25% by mass, more preferably 1 to 20% by mass, and further preferably 1 to 15% by mass.

The form of the molding precursor 5 is not particularly limited, but for example, a form in which the entire core 3 is arranged to be embedded by two sheet-shaped prepregs 4 is exemplified.

The molding die 10 in this example is used to manufacture a square tubular fiber reinforced plastic molded body and includes a lower mold 12 and an upper mold 14. A concave part 12a is formed at an upper surface side of the lower mold 12. A convex part 14a fitted to the concave part 12a of the lower mold 12 is formed at a lower surface side of the upper mold 14. In the molding die 10, by bringing the lower mold 12 and the upper mold 14 into close contact with each other to close the mold, a cavity having a shape complementary to a shape of a target fiber reinforced plastic molded body is formed inside.

It is sufficient that the molding die 10 includes an opening/closing mechanism, and a high-pressure pressing machine may not be employed. That is, in the stage of bringing the lower mold 12 and the upper mold 14 into close contact with each other to clamp the mold, the pressure to be applied to the molding precursor 5 may not be necessarily sufficiently high. Even when the pressure to be applied to the molding precursor 5 in the stage of closing the mold is not sufficient, as described later, the wax is melted at the time of the thermocompression molding to increase the internal pressure of the core, so that a sufficient pressure is applied to the molding precursor 5. Therefore, occurrence of a molding failure can be suppressed and a fiber reinforced plastic molded body with a high dimensional precision is obtainable.

As the method of performing the thermocompression molding, by the molding die 10, on the molding precursor 5, for example, the following method is exemplified. After the molding precursor 5 is formed by arranging the prepreg 4 around the core 3, the molding precursor 5 is preliminarily shaped at room temperature into substantially the same shape as the cavity shape of the molding die 10 to obtain the molding precursor 5 (preform). Next, the molding precursor 5 is placed in the concave part 12*a* of the lower mold 12 of the molding die 10 which has been heated in advance, the molding die 10 is closed to perform the thermocompression molding, and the prepreg 4 is cured.

Incidentally, the method for the thermocompression molding is not limited to the above-described method. For example, the following resin transfer molding (RTM) method may be employed. Specifically, instead of the prepreg, a fiber reinforcement material (fabric) not impregnated with a thermosetting resin is arranged around the core 3 and is placed in the concave part 12*a* of the lower mold 12, and the molding die 10 is clamped. Next, an uncured thermosetting resin is injected into the molding die 10, the thermosetting resin is impregnated in the fiber reinforcement material, and then the molding die 10 is cured by heating, thereby obtaining the molded body 6.

In the invention, it is preferable to perform the thermocompression molding under the condition that a relation between a melting point Tin (° C.) and an average molding temperature Tf (° C.) of the thermoplastic solid body typified by a wax or the like satisfies $Tf-60 \leq Tm \leq Tf$. In this way, in the invention, the thermoplastic solid body which is melted at a temperature equal to or lower than the molding temperature can be used in the core, and the thermocompression molding can be performed on the molding precursor while at least a part of the thermoplastic solid body accommodated in the barrier layer in the core is melted.

In this example, heat of the molding die 10 is transferred to the prepreg 4 and is further transferred also to the wax 1 through the barrier layer 2, so that at least a part of the wax 1 is melted.

Incidentally, in a case where the thermoplastic solid body is configured by a plurality of components each having a different melting point, the melting point Tm (° C.) indicates the lowest melting point among melting points of the plurality of components.

Further, in the invention, it is preferable to perform the thermocompression molding under the condition that, in a case where a melting point of the thermoplastic solid body 1 is designated as Tm (° C.), a temperature of heat molding is designated as Tf (° C.), and a melting point of a material forming the barrier layer 2 is designated as Tb (° C.), a relation thereof satisfies $Tm \leq Tf < Tb$. In this way, the thermoplastic solid body 1 which is melted at a temperature equal to or lower than the molding temperature is used in the core 3, and the thermocompression molding can be performed on the molding precursor while at least a part of the thermoplastic solid body 1 accommodated in the barrier layer 2 in the core 3 is melted.

In this example, heat of the molding die 10 is transferred to the prepreg 4 and is further transferred also to the thermoplastic solid body 1 through the barrier layer 2, so that at least a part of the thermoplastic solid body 1 is melted.

Incidentally, in a case where the barrier layer is configured by a plurality of components each having a different melting point, the melting point Tb (° C.) indicates the lowest melting point among melting points of the plurality of components.

Since the wax 1 is expanded by heating and is further largely expanded at the time of melting, the internal pressure of the core 3 increases at the time of the thermocompression molding. Further, since the wax 1 in a melted state in the barrier layer 2 flows, the internal pressure becomes uniform at the entire core 3. When the pressure of the core 3 becomes uniform, in the thermocompression molding, the pressure is uniformly applied to the prepreg 4 also in a direction other than the vertical direction in which the lower mold 12 and the upper mold 14 of the molding die 10 are closed.

Since the wax 1 is accommodated in the barrier layer 2 in the core 3, the melted wax 1 leaking outside the prepreg 4 is suppressed. Further, since the barrier layer 2 has flexibility and can be stretched, distortion of the outer shape of the core according to the flowing of the wax 1 is acceptable. Therefore, when the internal pressure increases by expansion of the wax 1, the core 3 is expanded. According to this, even if an air gap is formed between the core 3 and the prepreg 4 arranged around the core, the air gap is buried by the distortion of the core 3. Further, even when an air gap is formed between a molding surface and the prepreg 4 in a corner portion inside the molding die 10, the air gap is buried by the prepreg 4 being pressed against the molding surface according to the distortion of the core 3. In this way, since the prepreg 4 is in close contact with the core 3 on the molding surface of the molding die 10 with no gap, occurrence of a molding failure is suppressed, particularly, bending, wrinkles, voids, or the like of a rising surface hardly occur, and a molded body having a predetermined thickness and high dimensional precision is obtainable. Also in a case where a fiber reinforced plastic molded body having right angle corner portions is manufactured, a prepreg is sufficiently filled in corner portions of the molding die, and the corner portions have an right angle following the molding surface of the molding die with high precision.

When the air gap formed between the prepreg 4 and the core 3 is buried, the air gap is crushed by pressure from the core 3 or air constituting the air gap passes through the prepreg 4 and released from the gap of the molding die 10 into the atmosphere. When the air passes through the prepreg 4, holes are generated in the prepreg 4, but the holes are naturally blocked since the prepreg 4 has flowability.

In the thermocompression molding, only a part of the wax 1 may be melted or the entire wax 1 may be melted. The wax 1 is melted by heat transfer from the molding die 10, but since the wax 1 has a low thermal conductivity, particularly in a case where the volume of the core 3 is large and the molding time is short, only the surface layer of the wax 1 is melted.

In order to improve a molding cycle in the thermocompression molding, it is necessary to efficiently heat the prepreg. As heat is consumed for melting the wax of the core, a time for increasing the temperature of the prepreg is further required. In the view of improvement in the molding cycle, it is preferable to melt only the surface layer of the wax in the thermocompression molding. Further, in the case of melting only the surface layer of the wax, even if the melted wax leaks out from the barrier layer, the melted amount is small and the wax leaking out from the molding die is rapidly cooled and solidified, so that an adverse effect can be minimized.

Herein, the relation between the melting point Tm and the average molding temperature Tf of the thermoplastic solid body typified by a wax or the like is set to preferably $Tf-60 \leq Tm < Tf$, more preferably $Tf-50 \leq Tm \leq Tf-10$, and further preferably $Tf-40 \leq Tm \leq Tf-20$. When the melting point Tm is within the above-described range, occurrence of a molding failure can be suppressed and a fiber reinforced plastic molded body with excellent appearance is obtainable.

When the melting point Tm is set to preferably (Tf−60) or higher, more preferably (Tf−50) or higher, and further preferably (Tf−40) or higher, the thermoplastic solid body is hardly softened and the shape of the core is stable before the thermocompression molding, so that a degradation in appearance of the fiber reinforced plastic molded body caused by wrinkles occurring in the prepreg before the thermocompression molding can be suppressed. Further, the thermoplastic solid body is hardly softened at room temperature and the handleability of the core is improved. In addition, even when the thermoplastic solid body leaks out, the thermoplastic solid body is easily solidified and influence of the leakage thereof is small. When the melting point Tm is set to preferably Tf or lower, more preferably (Tf−10) or lower, and further preferably (Tf−20) or lower, the thermoplastic solid body is melted at the time of the thermocompression molding so that the internal pressure of the core is likely to increase, and a molding failure is easy to suppress.

Incidentally, the average molding temperature Tf means an average value of the mold temperatures from starting of molding to termination of molding.

The average molding temperature Tf at the time of the thermocompression molding depends on a curing temperature of the thermosetting resin of the prepreg and is preferably 110 to 160° C. and more preferably 120 to 150° C.

The melting point Tm of the thermoplastic solid body typified by a wax or the like is preferably 80 to 140° C., more preferably 90 to 130° C., and further preferably 100 to 120° C.

The melting point Tb of the barrier layer is preferably 110° C. or higher and more preferably 150° C. or higher.

Further, the relation between the melting point Tb and the average molding temperature Tf of the barrier layer is set to preferably $Tf+10 \leq Tb \leq Tf+60$, more preferably $Tf+15 \leq Tb < Tf+60$, and further preferably $Tf+20 \leq Tb \leq Tf+60$. When the melting point Tb is within the above-described range, it is possible to further reliably obtain the effect of the barrier layer that the melted wax 1 leaking outside the prepreg 4 is suppressed.

At the time of the thermocompression molding, the core may be pressed in the molding die. According to this, even in the case of manufacturing a large-sized fiber reinforced plastic, since the internal pressure of the core is easy to sufficiently increase, adjustment such as decreasing of the internal pressure of the core can be performed in a case where the pressure excessively increases, and a molding failure can be stably suppressed.

The pressing of the core is preferably performed by a rod provided in the molding die. As the rod, from the viewpoint of easy adjustment of a pressing force acting on the core, a piston rod is preferably used.

Figure 2:
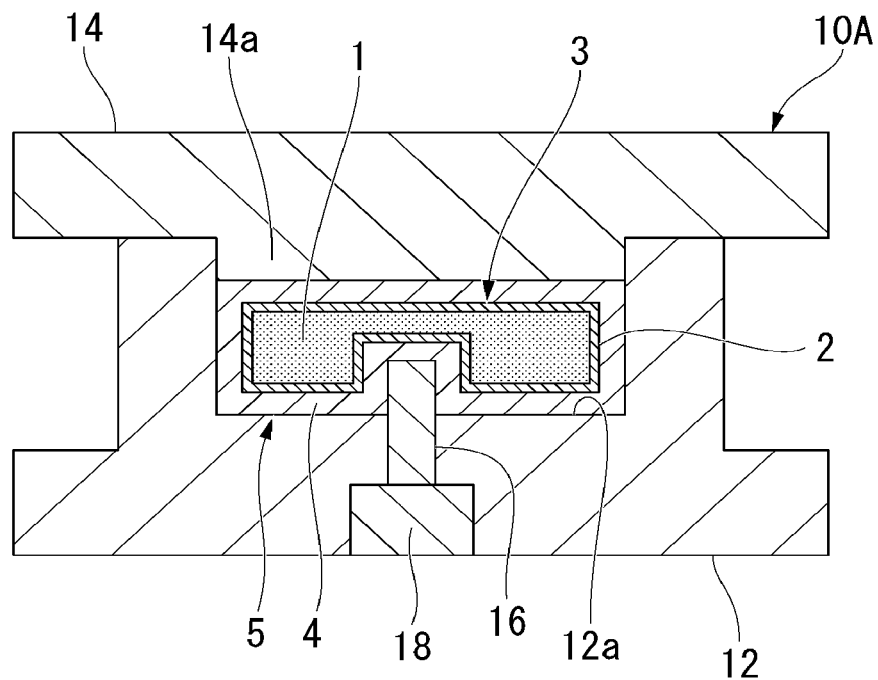
FIG. 2 is a schematic cross-sectional view illustrating an example of thermocompression molding in the method for manufacturing a fiber reinforced plastic molded body of the invention.

For example, a molding die 10A illustrated in FIG. 2 in which a piston rod 16 protruding into the concave part 12a is provided at the lower mold 12 can be used. The same components in FIG. 2 as those in FIG. 1 are denoted by the same reference numerals and descriptions thereof are omitted.

The piston rod 16 and a cylinder 18 are provided in the lower mold 12 of the molding die 10A. When working fluid is supplied and discharged to and from a pressure chamber (not illustrated) of the cylinder 18, the piston rod 16 is configured to project or retract in the cavity at the time of mold closing.

In this example, when the piston rod 16 projects in the cavity of the molding die 10 at the time of the thermocompression molding, the core 3 is partially pressed along with the prepreg 4. Since the wax 1 in the core 3 is melted, the pressing force is efficiently transferred to the entire core 3, and thus the pressure becomes uniform also in a portion away from a portion, which is pressed by the piston rod 16, of the core 3. The internal pressure of the core 3 is further increased by the pressing, and the melted wax 1 flows to cause the distortion of the core 3, so that the core 3 and the prepreg 4 are brought into closer contact with each other. Further, the prepreg 4 reaches every corner of the molding die 10 and is sufficiently pressed against the molding surface, so that an air gap is eliminated.

In a case where the internal pressure of the core 3 is excessively increased by the pressing, the pressure can be controlled by bringing the piston rod 16 down.

Incidentally, an embodiment of the pressing the core is not limited to the embodiment illustrated in FIG. 2. For example, a plurality of portions in the core may be pressed using a molding die provided with a plurality of rods. Further, a pressing hole is formed in the prepreg arranged around the core and the core may be directly pressed by a rod through the hole. Furthermore, in a case where the prepreg is not arranged around the entire core, a portion at which the prepreg is not present around the core may be pressed by a rod.

(Discharging Step of Thermoplastic Solid Body)

The wax 1 is discharged from the fiber reinforced plastic molded body 6 obtained after the molding step. As the method for discharging the wax 1, it is preferable to use a method for discharging the wax 1 outside the fiber reinforced plastic molded body 6 after the thermocompression molding at a temperature Tw that is equal to or lower than the heat distortion temperature Td (° C.) of the fiber reinforced plastic molded body 6 and equal to or higher than the melting point Tm (° C.) of the wax 1. Incidentally, this temperature Tw (° C.) is more preferably within a range of $Tm+10 \leq Tw \leq Td-10$ and further preferably within a range of $Tm+20 \leq Tw \leq Td-20$. When the temperature Tw (° C.) is within the above-described range, the wax 1 can be efficiently discharged while the thermal distortion of the fiber reinforced plastic molded body 6 is prevented. Further, in a case where the fiber reinforced plastic molded body 6 is configured by a plurality of components each having a different heat distortion temperature, the heat distortion temperature Td (° C.) indicates the lowest temperature among heat distortion temperatures of the plurality of components.

Specifically, for example, as illustrated in FIG. 3B, a discharge hole 7 is formed in the fiber reinforced plastic molded body 6, and then heating is performed at a temperature that is equal to or lower than the heat distortion temperature of the fiber reinforced plastic molded body 6 and equal to or higher than the melting point of the wax 1. According to this, as illustrated in FIG. 3C, the melted wax 1 is discharged from the discharge hole 7 outside the fiber reinforced plastic molded body 6. By melting the wax 1, even when the discharge hole 7 has a small diameter, the wax 1 can be discharged.

The method for forming the discharge hole 7 in the fiber reinforced plastic molded body 6 is not particularly limited, but examples thereof include drill processing and hole saw processing.

The method for heating the core 3 and the fiber reinforced plastic molded body 6 is not particularly limited, but examples thereof include oven heating and infrared heating.

In a case where a hole for directly pressing the core by a rod at the time of the thermocompression molding is formed in the prepreg, the hole remaining in the fiber reinforced plastic molded body may be used as a wax discharge hole. Other than the hole for directly pressing the core by a rod, a discharge hole for discharging the wax may be formed.

In the case of the elongated fiber reinforced plastic molded body 6 as described in this example, an air blowing hole may be further provided in the fiber reinforced plastic molded body 6 in addition to the discharge hole 7 in the range that there is no adverse effect on product quality, and the discharging of the wax 1 from the discharge hole 7 by performing air blowing through the air blowing hole may be promoted. Further, a string is prepared to be present in the core in advance, and the discharging of the wax by pulling the string at the time of discharging the wax can also be promoted.

The barrier layer 2 in the fiber reinforced plastic molded body 6 may be taken out if necessary, or may remain in the fiber reinforced plastic molded body 6 without change.

In the method for manufacturing a fiber reinforced plastic molded body of the invention described above, the thermocompression molding is performed using the thermoplastic solid body typified by a wax or the like as the core. Since the internal pressure of the core can be sufficiently increased by melting at least a part of the thermoplastic solid body at the time of the compression molding, proceeding of the prepreg being cured in a state in which there is an air gap between the core and the prepreg or between the prepreg and the molding surface of the molding die can be suppressed. Further, since the thermoplastic solid body is hardly softened and the shape of the core is stable before the thermocompression molding, wrinkles less occur in the prepreg before the thermocompression molding and occurrence of wrinkles also in the fiber reinforced plastic molded body can be suppressed. In this way, even in the case of a large-sized fiber reinforced plastic molded body, occurrence of a molding failure can be suppressed, and a fiber reinforced plastic molded body with excellent appearance can be efficiently and economically manufactured.

The dimension of the fiber reinforced plastic molded body is not particularly limited, but the method for manufacturing a fiber reinforced plastic molded body of the invention can be particularly suitably employed, for example, in manufacturing a molded body having a core volume of 100 cm3 or more.

Incidentally, the method for manufacturing a fiber reinforced plastic molded body of the invention is not limited to the above-described method. For example, the above-described method is a method for manufacturing a square tubular fiber reinforced plastic molded body, but may be a method for manufacturing a fiber reinforced plastic molded body having a U-shaped cross-section. In this case, a molding precursor in which a part of a core is exposed and other parts are covered by a prepreg is formed, and thermocompression molding is performed in a state in which a part of the core is in contact with a molding surface of a molding die. Further, in discharging of the thermoplastic solid body typified by a wax or the like, it is not necessary to provide a discharge hole in the fiber reinforced plastic molded body.

EXAMPLES

Hereinafter, the invention will be further described by means of Examples, but the invention is not limited to the following description.

[Internal Pressure of Core and Surface Temperature and Center Temperature of Wax]

The internal pressure of the core in the thermocompression molding was measured by a piezoelectric pressure sensor. Further, the surface temperature and the center temperature of the wax in the core were measured by a thermocouple. Incidentally, in the measurement, the molding precursor 5 was placed to the lower mold 12 after 60 seconds from the measurement start and then mold clamping was performed, and then after 360 seconds (molding time of 5 minutes), mold opening was performed.

[Appearance Evaluation]

The appearance of the fiber reinforced plastic molded body obtained in each example was checked by visual inspection and evaluated by the following evaluation criteria.

⊚: Chipping of the corner portion and occurrence of wrinkles and the like were suppressed, and appearance was quite excellent.

○: Chipping of the corner portion and occurrence of wrinkles and the like were suppressed, but visual disarray in appearance existed.

x: Chipping of the corner portion and occurrence of wrinkles and the like were recognized, and appearance deteriorated.

[Workability]

⊚: At the time of the hot-press molding, the distortion of the molding precursor hardly occurred, and it was easy to manufacture the core or the barrier layer.

○: At the time of the hot-press molding, slight distortion of the molding precursor due to its own weight was recognized, but there was no serious problem in manufacturing the core or the barrier layer.

x: At the time of the hot-press molding, the distortion of the molding precursor due to its own weight frequently occurred.

Example 1

Figure 4:
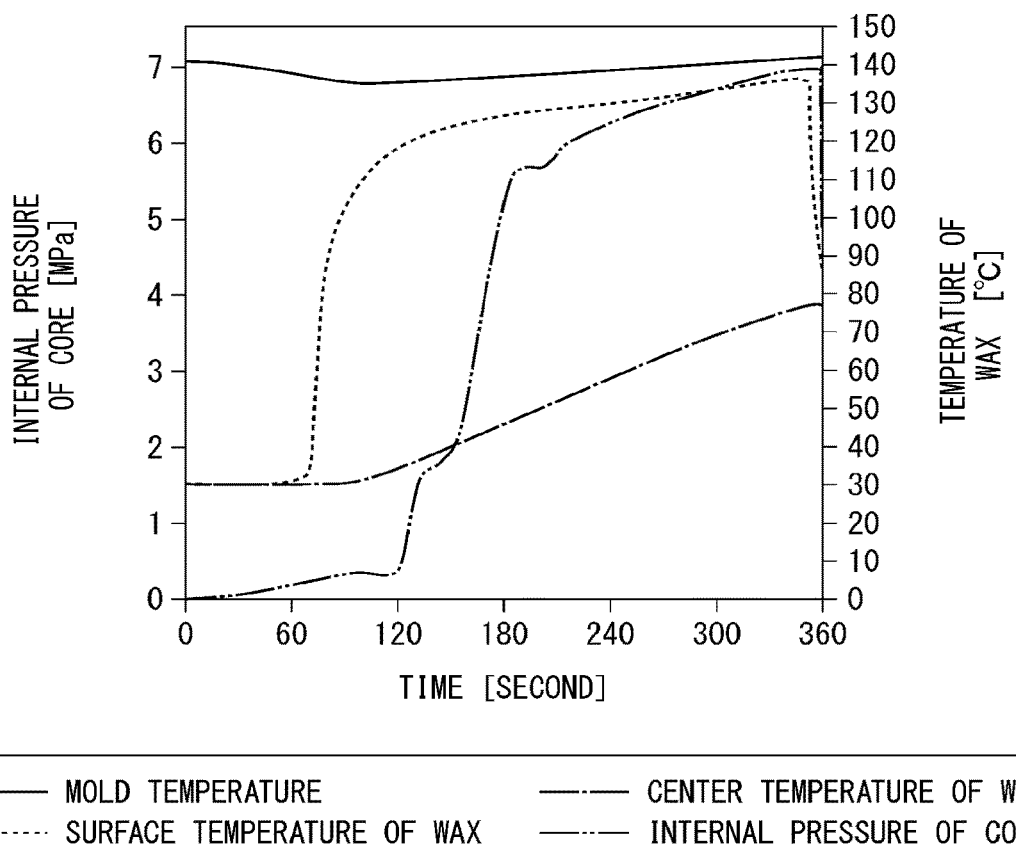
FIG. 4 is a graph showing results obtained by measuring an internal pressure of a core and a surface temperature and a center temperature of a wax in thermocompression molding of Example 1.

A synthetic wax (product name "File-A-Wax Green," manufactured by Freeman Manufacturing & Supply Company, melting point Tm: 117° C., density: 0.9 g/cm$^3$) was used as the wax 1 and put in a shrink tube made of polyolefin (thickness: 15 μm; melting point Tb: 145° C.), and both ends of the shrink tube was heat-sealed to form the barrier layer 2 formed by a flexible bag, thereby manufacturing the core 3. Next, a prepreg (manufactured by Mitsubishi Rayon Co., Ltd., product name "TR3110 360GMP"; resin content: 40% by mass) obtained by immersing an epoxy resin in a fiber reinforcement material formed by carbon fibers was used as the prepreg 4, two prepregs were arranged to cover the circumference of the entire core 3, and then the obtained product was preliminarily shaped at room temperature into substantially the same shape as the cavity shape of the molding die 10 to obtain the molding precursor 5 (preform). The molding precursor 5 was disposed in the concave part 12a of the lower mold 12 of the molding die 10 to close the molding die 10, and the thermocompression molding was performed while the average molding temperature from the mold closing to the mold opening was set to 140° C. and the molding time was set to 5 minutes, thereby manufacturing the fiber reinforced plastic molded body 6 embedding the core 3. The results obtained by measuring the internal pressure of the core 3 and the surface temperature and the center temperature of the wax at the time of the thermocompression molding are shown in FIG. 4.

The discharge hole 7 (diameter: 10 mm) for discharging the wax was formed in the fiber reinforced plastic molded body 6 by drill processing. The core 3 and the fiber reinforced plastic molded body 6 were heated to 130° C. by oven heating so that the wax 1 was melted and discharged from the discharge hole 7, thereby obtaining the square tubular fiber reinforced plastic molded body 6 having a size of 73 mm×37 mm×26 mm.

Example 2

A square tubular fiber reinforced plastic molded body was obtained in the same manner as in Example 1, except that hollow glass beads (density: 0.2 g/cm³) were used as the filler and a mixture in which the proportion of the hollow glass beads with respect to the total mass of the wax and the hollow glass beads is set to 30% by volume was used as the core.

Example 3

A square tubular fiber reinforced plastic molded body was obtained in the same manner as in Example 1, except that a polypropylene wax (melting point Tm: 165° C.) was used as the wax 1.

Example 4

A square tubular fiber reinforced plastic molded body was obtained in the same manner as in Example 1, except that a synthetic wax (product name "TOYO UTILITY WAX," manufactured by TOYOKAGAKU KENKYUSHO CO., LTD., melting point Tm: 72° C.) was used as the wax 1.

Example 5

A square tubular fiber reinforced resin molded body was obtained in the same manner as in Example 1, except that the barrier layer 2 (thickness: 40 μm; melting point Tb: 165° C.) was formed using a shrink tube made of polypropylene.

Example 6

A square tubular fiber reinforced resin molded body was obtained in the same manner as in Example 1, except that the barrier layer 2 (thickness: 25 μm; melting point Tb: 200° C.) was formed using a shrink tube made of polyvinyl chloride.

Example 7

A square tubular fiber reinforced resin molded body was obtained in the same manner as in Example 1, except that the barrier layer 2 (thickness: 0.1 mm) formed by a coating material was formed by applying an acrylic liquid rubber (manufactured by YUTAKA MAKE Co., Ltd., BE-1) to the wax and drying the acrylic liquid rubber, instead of a shrink tube.

Example 8

A square tubular fiber reinforced resin molded body was obtained in the same manner as in Example 7, except that the barrier layer 2 (thickness: 0.2 mm) was formed by applying and drying a silicone-based liquid rubber (manufactured by Shin-Etsu Chemical Co., Ltd., KE-66).

Example 9

A square tubular fiber reinforced resin molded body was obtained in the same manner as in Example 1, except that the barrier layer 2 (thickness: 0.2 mm; melting point Tb: 115° C.) formed by a coating material was formed by applying an acrylic liquid rubber to the wax and drying the acrylic liquid rubber, then pasting a polyamide-based non-woven fabric (Kureha Ltd., LNS0015) thereto, and further applying a liquid rubber.

Example 10

A square tubular fiber reinforced resin molded body was obtained in the same manner as in Example 9, except that the barrier layer 2 (thickness: 0.2 mm; melting point Tb: 150° C.) was formed using a polyester-based non-woven fabric (Kureha Ltd., G5025) instead of a polyamide-based non-woven fabric.

Molding conditions and evaluation results of respective examples are presented in Table 1.

TABLE 1

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Melting point Tm [° C.] of wax | 117 | 117 | 165 | 72 | 117 | 117 | 117 | 117 | 117 | 117 |
| Average molding temperature Tf [° C.] | 140 | 140 | 140 | 140 | 140 | 140 | 140 | 140 | 140 | 140 |
| Tf − Tm [° C.] | 23 | 23 | −28 | 68 | 23 | 23 | 23 | 23 | 23 | 23 |
| Proportion [% by volume] of filler | 0 | 30 | 0 | 0 | 0 | 0 | 0 | 0 | 0 | 0 |
| Barrier layer | Polyolefin flexible bag | Polyolefin flexible bag | Polyolefin flexible bag | Polyolefin flexible bag | Polypropylene flexible bag | Polyvinyl chloride flexible bag | Acrylic coating | Silicone-based coating | Acrylic coating + polyamide non-woven fabric | Acrylic coating + polyester non-woven fabric |
| Appearance evaluation | ○ | ○ | X | X | ○ | ○ | ⊙ | ⊙ | ⊙ | ⊙ |
| Workability | ○ | ⊙ | ○ | ○ | ○ | ○ | ○ | ○ | ⊙ | ⊙ |

As presented in Table 1, in each Example, at the time of the hot-press molding, although distortion of the molding precursor hardly occurred and workability was excellent, particularly, Example 2 in which a further decrease in weight of the molding precursor is achieved and Examples 9 and 10 in which the strength of the barrier layer is improved were particularly excellent in workability.

Further, in Examples 7 to 10 using a coating material as the barrier layer, a fiber reinforced plastic molded body with quite excellent appearance was obtainable. Furthermore, as shown in FIG. 4, in Example 1, the surface temperature of the wax in the thermocompression molding was higher than the melting point Tm and the internal pressure of the core increased by the surface layer being melted by heating.

EXPLANATIONS OF LETTERS OR NUMERALS

1 WAX (THERMOPLASTIC SOLID BODY)
2 BARRIER LAYER
3 CORE
4 PREPREG
5 MOLDING PRECURSOR
6 FIBER REINFORCED PLASTIC MOLDED BODY
7 DISCHARGE HOLE
10, 10a MOLDING DIE
12 LOWER MOLD
14 UPPER MOLD
16 PISTON ROD
18 CYLINDER

The invention claimed is:

1. A method for manufacturing a fiber reinforced plastic molded body, the method comprising:
performing thermocompression molding, by using a molding die, on a molding precursor,
wherein the molding precursor is obtained by arranging a prepreg comprising a thermosetting resin and a fiber around a wax and forming a barrier layer between the prepreg and the wax, and
wherein, in the thermocompression molding, at least a part of the wax is melted and expands, and the molten wax is suppressed by the barrier layer from leaking outside the prepreg, such that internal pressure of a core, comprising the barrier layer and the wax, increases.

2. The method of claim 1, wherein a density of the wax is 2 g/cm$^3$ or less.

3. The method of claim 2, wherein a density of the wax is in a range of from 0.6 to 2 g/cm$^3$.

4. The method of claim 1, wherein a filler having a lower density than that of the wax is further accommodated in the wax.

5. The method of claim 1, wherein the barrier layer is formed using a flexible bag.

6. The method of claim 1, wherein the barrier layer comprises a fiber reinforcing material.

7. The method of claim 1, wherein the thermocompression molding is performed under conditions wherein a relation between a melting point Tm (° C.) of the wax and an average molding temperature Tf (° C.) satisfies Tf−60≤Tm≤Tf.

8. The method of claim 1, wherein a material forming the barrier layer has a melting point Tb (° C.), and
wherein the thermocompression molding is performed under conditions wherein a relation between a melting point Tm (° C.) of the wax and an average molding temperature Tf (° C.) and a melting point Tb (° C.) of the material forming the barrier layer satisfies Tm≤Tf<Tb.

9. The method of claim 1, wherein, in the thermocompression molding, at least a part of a surface layer portion of the wax is melted.

10. The method of claim 1, wherein the wax is pressed in the molding die at the time of the thermocompression molding.

11. The method of claim 1, wherein the wax is removed from the obtained fiber reinforced plastic molded body after the thermocompression molding.

12. The method of claim 11, wherein the wax is discharged outside the fiber reinforced plastic molded body at a temperature that is equal to or lower than a heat distortion temperature of the fiber reinforced plastic molded body and equal to or higher than a melting point Tm (° C.) of the wax.

13. The method of claim 1, wherein the barrier layer is formed using a coating material.

14. The method of claim 1, wherein the barrier layer is formed from a liquid rubber.

15. The method of claim 1, wherein the fiber is a carbon fiber.

16. The method of claim 1, wherein an average molding temperature in the thermocompression molding is 110 to 160° C.

17. The method of claim 1, wherein an average molding temperature in the thermocompression molding is 120 to 150° C.

18. The method of claim 1, wherein the wax has a melting point Tm in a range of from 80 to 140° C.

19. The method of claim 1, wherein only a part of the wax is melted.

20. The method of claim 1, wherein a substantially entire surface of the wax in the molding precursor is directly coated with the barrier layer.

* * * * *